(12) United States Patent
Revaud

(10) Patent No.: US 9,928,440 B2
(45) Date of Patent: Mar. 27, 2018

(54) METHOD AND APPARATUS FOR DETECTING FOREGROUND WINDOWS

(71) Applicant: Xerox Corporation, Norwalk, CT (US)

(72) Inventor: Jerome Revaud, Meylan (FR)

(73) Assignee: CONDUENT BUSINESS MACHINES SERVICES, LLC, Dallas, TX (US)

( * ) Notice: Subject to any disclaimer, the term of this patent is extended or adjusted under 35 U.S.C. 154(b) by 0 days.

(21) Appl. No.: 15/210,617

(22) Filed: Jul. 14, 2016

(65) Prior Publication Data

US 2018/0018534 A1 Jan. 18, 2018

(51) Int. Cl.
G06K 9/62 (2006.01)
G06K 9/46 (2006.01)

(52) U.S. Cl.
CPC ........... G06K 9/4614 (2013.01); G06K 9/627 (2013.01)

(58) Field of Classification Search
CPC ...... G06K 9/4614; G06K 9/3275; G06T 7/13; G06T 2207/20021
See application file for complete search history.

(56) References Cited

U.S. PATENT DOCUMENTS

| 2002/0051056 | A1* | 5/2002 | Holtslag | G09G 5/003 348/135 |
| 2004/0125149 | A1* | 7/2004 | Lapidous | G06F 3/0481 715/808 |
| 2009/0141940 | A1* | 6/2009 | Zhao | G06K 9/00295 382/103 |
| 2011/0116715 | A1* | 5/2011 | Wang | G06K 9/00469 382/177 |

* cited by examiner

*Primary Examiner* — Brian Werner

(57) ABSTRACT

A method, non-transitory computer readable medium and apparatus for detecting a window in a display are disclosed. For example, the method includes scanning pixels within each frame of a plurality of frames that is displayed via a sliding window, extracting one or more features from each pixel within the sliding window, applying a classification function to classify a subset of potential pixels comprising the each pixel within the sliding window as corner pixels based on the one or more features that match predefined features associated with the corner pixels and detecting the window based on the corner pixels and additional pixels within a boundary defined by the corner pixels.

12 Claims, 5 Drawing Sheets

METHOD AND APPARATUS FOR DETECTING FOREGROUND WINDOWS

The present disclosure relates generally to displays and, more particularly, to a method and apparatus for detecting windows in a display.

BACKGROUND

Windows that are displayed on a monitor for operating systems and graphical user interfaces are approximately rectangular boxes. Each window may be associated with an application, a dialog, a message box and the like. In some operating systems, each window is assigned a depth. Thus usually a single window is active and is a foreground window and all other windows are layered behind the foreground window.

Some windows can appear abruptly and interrupt a current foreground window. For example, a pop-up window can automatically appear as the foreground window deactivating the current window and sending the current window into the background behind the pop-up window. In certain applications, such automatic pop-up windows can be a nuisance and interrupt the applications.

SUMMARY

According to aspects illustrated herein, there are provided a method, non-transitory computer readable medium and apparatus for detecting a window in a display. One disclosed feature of the embodiments is a method that scans pixels within each frame of a plurality of frames that is displayed via a sliding window, extracts one or more features from each pixel within the sliding window, applies a classification function to classify a subset of potential pixels comprising the each pixel within the sliding window as corner pixels based on the one or more features that match predefined features associated with the corner pixels and detects the window based on the corner pixels and additional pixels within a boundary defined by the corner pixels.

Another disclosed feature of the embodiments is a non-transitory computer-readable medium having stored thereon a plurality of instructions, the plurality of instructions including instructions which, when executed by a processor, cause the processor to perform operations that scan pixels within each frame of a plurality of frames that is displayed via a sliding window, extract one or more features from each pixel within the sliding window, apply a classification function to classify a subset of potential pixels comprising the each pixel within the sliding window as corner pixels based on the one or more features that match predefined features associated with the corner pixels and detect the window based on the corner pixels and additional pixels within a boundary defined by the corner pixels.

Another disclosed feature of the embodiments is an apparatus comprising a processor and a computer-readable medium storing a plurality of instructions which, when executed by the processor, cause the processor to perform operations that scan pixels within each frame of a plurality of frames that is displayed via a sliding window, extract one or more features from each pixel within the sliding window, apply a classification function to classify a subset of potential pixels comprising the each pixel within the sliding window as corner pixels based on the one or more features that match predefined features associated with the corner pixels and detect the window based on the corner pixels and additional pixels within a boundary defined by the corner pixels.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for detecting a foreground window. As discussed above, windows that are displayed on a monitor for operating systems and graphical user interfaces are approximately rectangular boxes. Each window may be associated with an application, a dialog, a message box and the like. In some operating systems, each window is assigned a depth. Thus usually a single window is active and is a foreground window and all other windows are layered behind the foreground window.

Some windows can appear abruptly and interrupt a current foreground window. For example, a pop-up window can automatically appear as the foreground window deactivating the current window and sending the current window into the background behind the pop-up window. In certain applications, such automatic pop-up windows can be a nuisance and interrupt the applications.

For example, some bot or automated applications may automate manual tasks that would traditionally be performed by a user. For example, these bot or automated applications may perform various repetitive tasks, such as collecting information from a webpage and entering the information into a spreadsheet. However, when a pop-up window appears, the pop-up window can cause errors, cause the bot application to crash, or require human intervention. The present disclosure for detecting a window automatically can be applied to detect the windows, identify the improper foreground window and close the improper foreground window to prevent the bot application from crashing.

To illustrate, when a bot application is performing automated tasks on a webpage, the webpage may be detected as the current foreground window and the proper foreground window. However, when a pop-up window appears, the method may automatically detect that the pop-up window. In addition, the method may determine that the pop-up window is the current foreground window and is not the proper foreground window and take additional action. For example, the pop-up window may be automatically closed, the webpage may be selected to become the foreground window again over the pop-up window, and the like.

Figure 1:
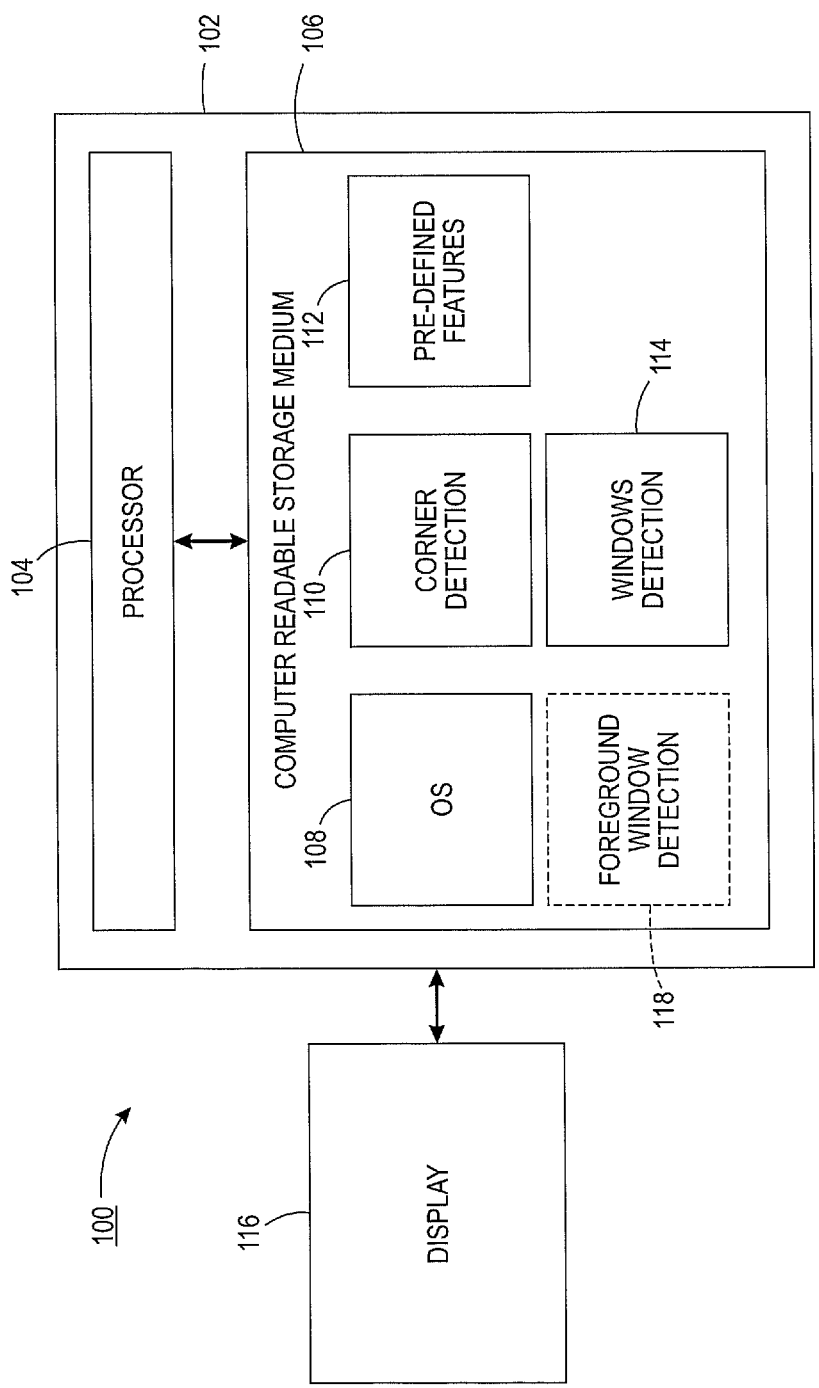
FIG. 1 illustrates an example apparatus of the present disclosure.

FIG. 1 illustrates an example system 100 of the present disclosure. In one embodiment, the system 100 may include an apparatus 102 in communication with a display 116. The apparatus 102 may generate a plurality of frames that are displayed on the display as video of a graphical user interface (GUI).

In one embodiment, the apparatus 102 may include a processor 104 and a non-transitory computer readable storage medium 106. In one embodiment, the non-transitory computer readable storage medium 106 may store various modules or data that are executed or used by the processor 104 to perform the functions described herein. In one embodiment, the non-transitory computer readable storage medium may include an operating system (OS) 108, a corner detection module 110, stored pre-defined features 112, a windows detection module 114 and an optional foreground window detection module 118.

Figure 2:
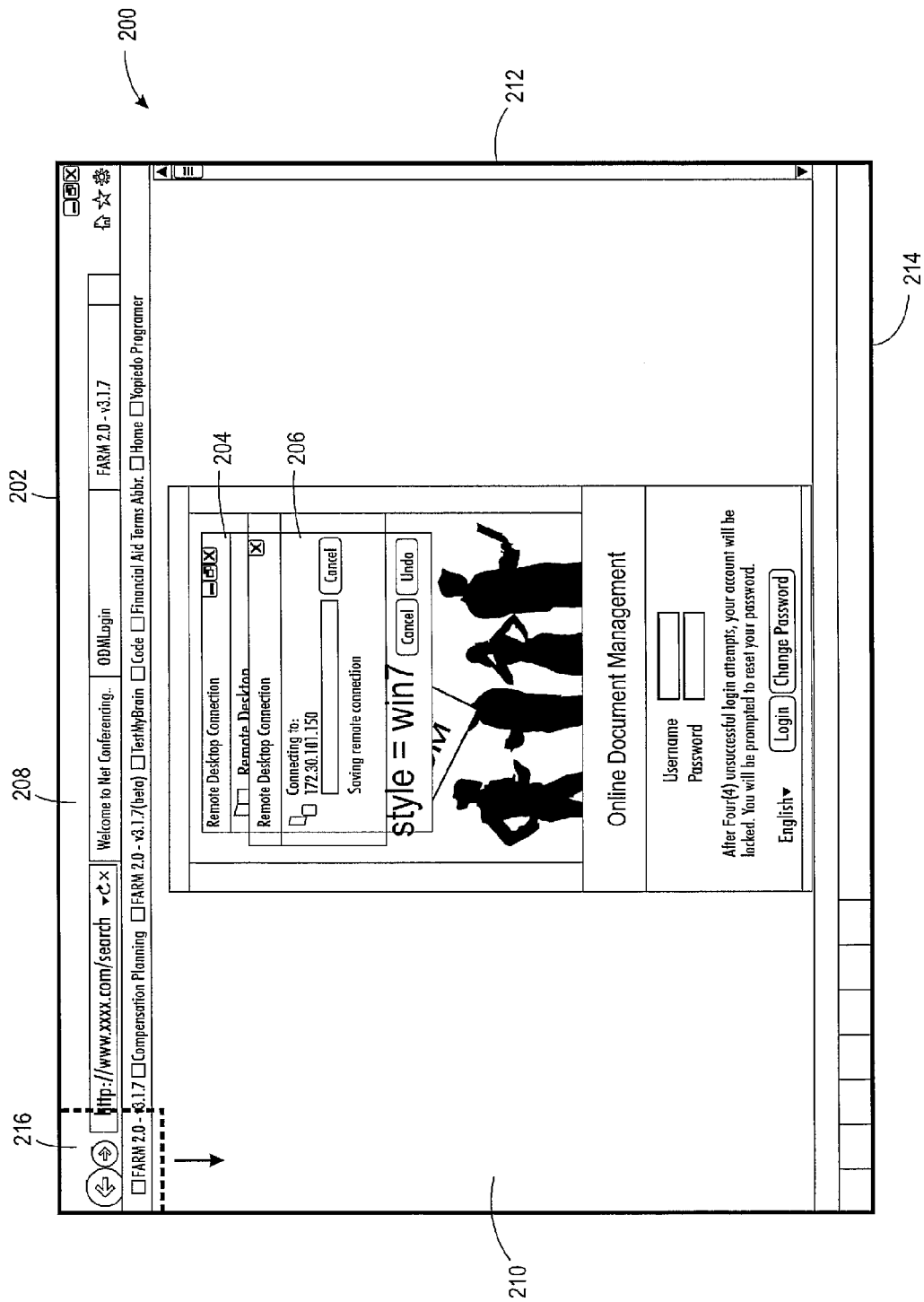
FIG. 2 illustrates an example screenshot of the present disclosure.

In one embodiment, the OS 108 may include any type of OS such as, Windows®, Mac OS®, Linux®, and the like. In one embodiment, the OS 108 may generate GUI that includes one or more windows. FIG. 2 illustrates one example of a GUI 200 that includes windows 202, 204 and 206. Although three windows are illustrated in FIG. 2, it should be noted that the GUI 200 may include more than or less than three windows. The OS 108 may generate windows that have a particular known style, theme, color pattern, and the like. For example, typically the OS 108 may deploy a default style for the windows or the user may select a custom style. Once the style is selected for the windows, each window may have a known style, theme, color pattern, and the like which may be used to pre-define features. The pre-defined features associated with a window may be used to identify groups of pixels as possible corner pixels and detect a window based on the corner pixels that are identified, as discussed in further detail below.

For example, as illustrated in FIG. 2, each window 202, 204 and 206 may have a top side 208, a left side 210, a right side 212 and a bottom side 214. Each one of the sides 208, 210, 212 and 214 may have a constant color bar, or a thick black line that borders the window, and the like. These patterns may be used to detect corners of the windows 202, 204 and 206 that may define the boundaries of the windows 202, 204 and 206, which in turn can be used to detect the windows 202, 204 and 206 in the GUI 200.

The corner detection module 110 may use a feature extraction function and a classification function to detect corners pixels of windows 202, 204 and 206 in the GUI 200. In one embodiment, the GUI 200 that is illustrated in FIG. 2 may be representative of a single frame of a plurality of frames. For example, the display 116 may have a particular refresh rate of 24 frames per second, 60 frames per second, and so forth. In one embodiment, for each frame, the corner detection module 110 may use a sliding window 216 to analyze all of the pixels within each frame. The sliding window 216 may analyze a group, or a subset, of pixels at a time. In one embodiment, the sliding window 216 may include any number of pixels, for example, 5, 20, 50, and the like.

In one embodiment, the feature extraction function may be a Haar-like feature extraction function. In one embodiment, each Haar-like feature may be computed as an average value of a single-channel image I with I: $\mathbb{N} \times \mathbb{N} \rightarrow \mathbb{R}$, in a rectangular region R, wherein R=[l, t, r, b] (left (l), top (t), right (r) and bottom (b) coordinates). Equation (1) below denotes Haar-like features as $A_I(R)$ as follows:

$$A_I(R) = \frac{1}{R}\sum_{i=R_l}^{R_r}\sum_{j=R_t}^{R_b} I(i, j) =$$

$$\frac{1}{R}(L_I(R_r, R_b) + L_I(R_l, R_t) - L_I(R_r, R_t) - L_I(R_l, R_b)),$$

Equation 1 where $L_I$ is the integral image of I as shown by Equation 2 below:

$$L_I(i,j) = \Sigma_{u=1...i}\Sigma_{v=1...j}I(u,v)$$

Equation 2:

Equations 1 and 2 may be used to extract features from the pixels within the sliding window 216 that are analyzed. In one embodiment, the known theme or style of the windows 202, 204 and 206 selected for the OS 108 may be used to pre-define features that indicate a possible corner that can define the boundaries of window.

In one embodiment, the features may be strong edges that often occur near window borders. For example, the strong edges may be defined by low variance in the color from pixel to pixel, pixel value from pixel to pixel, gradient from pixel to pixel and the like. In one embodiment, low variance may be defined as having a value below a threshold (e.g., variances less than 1%, 5%, or any other desired value). To detect the strong edges, absolute gradient channels may be defined as $$G_I^x = \left|\frac{\partial I}{\partial x}\right|$$

and likewise for $G_I^y$ where x and y are coordinate values within the frame that is displayed.

Then, a group of pixels with a low variance $V_I(R)$ may be detected using Equation 3 below:

$$V_I(R) = A_{I^2}(R) - A_I^2(R)$$

Equation (3):

where $I^2$ denotes the pixel-wise squared image. Both terms can be computed in constant time, so that the complexity to compute the variance feature is constant as well.

In one embodiment, the Haar-like features may be formalized as a triplet h=(t, c, R) where t corresponds to the feature type (e.g., color-based, gradient-based or variance-based), c to the color channel (e.g., luminance, or one of the red, green, blue channels) and R the region. At training time, all types of features for all channels for a large set of random rectangles may be extracted and the corner detection module 110 may determine which Haar-like features h=(t, c, R) are useful for detecting corners, and thus, the windows.

The classification function may then be applied to determine the subsets of pixels that could be corner pixels based on the Haar-like features that are extracted. In one embodiment, an adaptive boosting classifier function may be applied.

In one embodiment, within a target region T (e.g., the pixels within the sliding window 116) a large number M of Haar-like triplets $\{h_i=(t_i, c_i, R_i)|R_i \in T\}_{i=1...M}$ may be generated. Since the target region is relatively small, the triplets may exhaustively cover all possible sub-rectangles of T. Then given a set of training images that were used to create the pre-defined features, the Haar-like feature value for every triplet $h_i$ may be computed. The computed values may be the training image descriptors. During training, an adaptive boosting function may be applied to select a small subset of the feature descriptors and combine them to form a corresponding decision function.

In one embodiment, at detection time the classification may then detect the groups of pixels that are corner pixels. For example, the pre-defined features 112 may include those features that are known to be corners based on a particular theme or style of windows that are selected for the OS 108. The pre-defined features 112 may include four different pre-defined features for the top left corner, the top right corner, the bottom left corner and the bottom right corner. The classification function gives a score for each pixel and each type of corner (top left corner, top right, bottom left and bottom right). The pixel scores for each type of corner form a score map $C_k$ with k=1 . . . 4 (where k=1 means top left, k=2 means top right, k=3 means bottom left and k=4 means bottom right).

In one embodiment, a non-maxima suppression on the score maps $C_k$ may be applied to obtain a sparse set of corner detections. All pixels $C_k(l, j)$ which are not local maxima pixels may be pruned.

The windows detection module 110 may then propose those areas that could be windows based on the results from the corner detection module 110. For example, the corners may represent the boundaries of a window and the region enclosed by the additional pixels within the boundary created by the corner pixels may represent a possible window.

From these sets the proposal P=[l, t, r, b] may be generated. P may be defined as a valid proposal if at least three corners out of four are in $C_k$. In one embodiment, all possible triplets of points in $C_k$ could be generated. In another embodiment, a more efficient way of proposing the windows may be applied. The more efficient solution may compute a list of rows that support the top side of a proposal P. For instance, if two corner detections (10, 5)$\epsilon C_1$ and (80, 5)$\epsilon C_2$ are found, then the row at y=5 is supporting the top side of a box P=[10, 5, 80, b] $\forall$b. In other words, supporting rows may be obtained by intersecting $\{y|(x,y)\epsilon C_1\} \cap \{y|(x,y)\epsilon C_2\}$. This may be repeated to obtain supporting rows and columns for the three other sides of a rectangle. All possible proposals based on these four sets may be enumerated while simultaneously checking for the "at least three corners" criterion. The above procedure is faster than proposing all windows based on all possible triples because the number of supporting rows and columns are much smaller than the size of individual corner sets $\{C_k\}$.

After the proposals are generated, the windows detection module 114 may verify that the proposals are actual windows (e.g., windows 202, 204 and 206). In one embodiment, the windows detection module 114 may run a final classifier function to verify if the proposed regions are windows. In one embodiment, since the appearance of a window is known a priori based on the style or theme that is selected for the OS 108, the final classification may be based on extraction of features only in the border areas.

Figure 3:
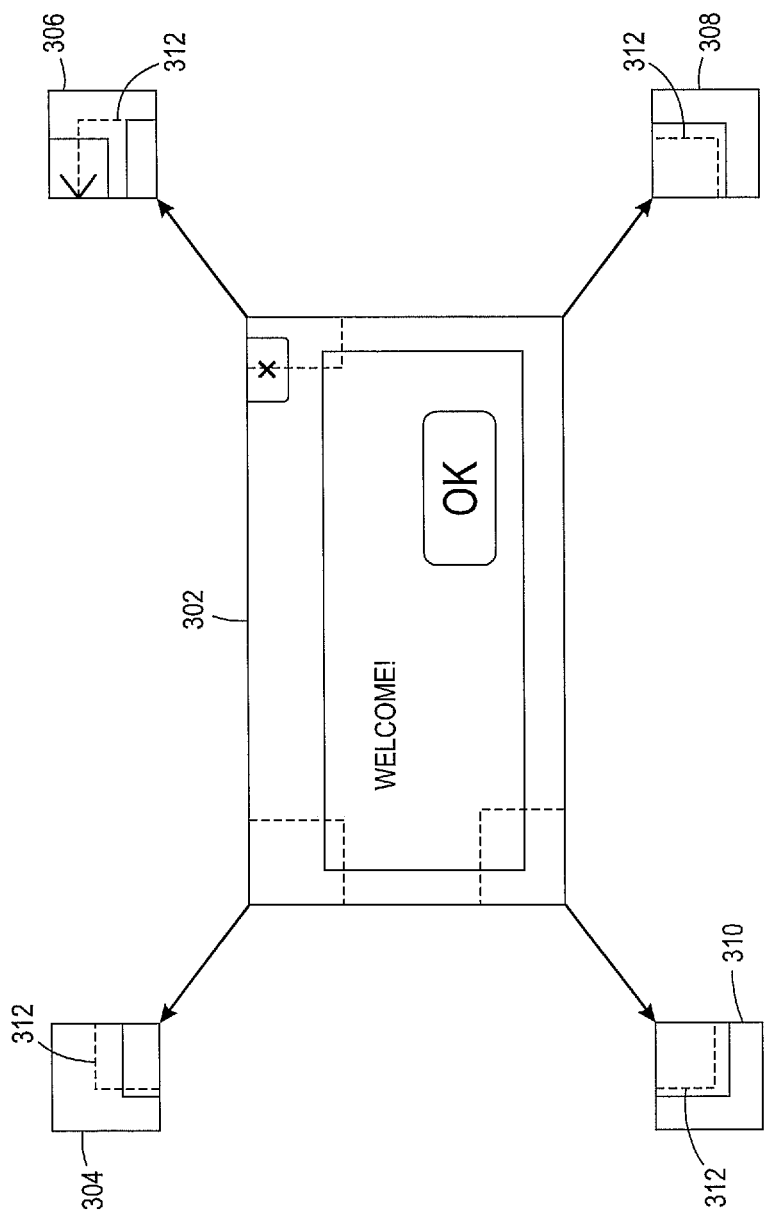
FIG. 3 illustrates an illustrative example of corner detection.

FIG. 3 illustrates an example of the border areas of the corner pixels that are analyzed for a window 302. For example, corner pixels 304, 306, 308 and 310 may have been classified by the first application of the classification function. In a final pass, the classification function may analyze the border areas illustrated by the dotted lines 312. In one example, the border areas may be defined as an area that is 5 pixels wide and 20 pixels long.

The features from the border areas may be extracted again using the Haar-like features function described above. The extracted features are then classified again. For example, the same classification function (e.g., the adaptive boosting classification function) may be applied to the final classification as was applied in the initial classification.

After the feature extraction and classification, the corner pixels 304, 306, 308 and 310 may be verified as a top left corner, a top right corner, a bottom right corner and a bottom left corner of a window. Thus, the region enclosed by a boundary formed by the corner pixels 304, 306, 308 and 310 may be detected as a window.

In one embodiment, the optional foreground window detection module 118 may be used to detect a foreground window. For example, the window detection capability of the apparatus 102 may be extended for particular applications. For example, once a plurality of windows are detected, the foreground window detection module 118 may detect which window is the foreground window. The foreground window detection module 118 may also determine if the current foreground window is the correct foreground window, and if the current foreground window is not the correct foreground window, automatically take action such that the correct window is selected as the foreground window.

For example, as described above, certain bot or automated applications may automate manual tasks to collect data from a webpage and populate a spreadsheet with the data. However, if a pop-up window appears and becomes a current foreground window, the pop-up window may cause the bot or automated application to error, fail, or crash.

In one embodiment, the foreground window detection module 118 may know which window is the desired foreground window for the bot application to run. For example, the foreground window detection module 118 may identify the foreground window when the bot application is initiated or executed. For example, in FIG. 2, the desired foreground window may be the window 202.

The foreground window detection module 118 may periodically check, which window is the foreground window. For example, the foreground window may be the window that is on top of all other windows. For example, in FIG. 2, the window 206 may be defined as the foreground window as it is on top of the other windows 202 and 204. Said another way, the foreground window may be the window that is currently "active" in the GUI 200.

When the foreground window detection module 118 determines that the foreground window is not desired, the foreground window detection module 118 may initiate an automated action. For example, the foreground window detection module 118 may detect that a pop-up window 206 has become the foreground window 206 instead of the desired foreground window 202.

In one embodiment, the foreground window detection module 118 may take an automated action of closing the foreground window 206 to cause a different window 202 or 204 to be the foreground window. The foreground window detection module 118 may again check to see if the current foreground window is the desired foreground window 202. If not, the foreground window detection module 118 may again close the current foreground window until the window 202 becomes the current foreground window.

In another embodiment, the foreground window detection module 118 may select the window 202 to be the foreground window. For example, when the pop-up window 206 is detected as being the foreground window, the foreground window detection module 118 may select the window 202 causing the window 202 to become the current foreground window.

Figure 4:
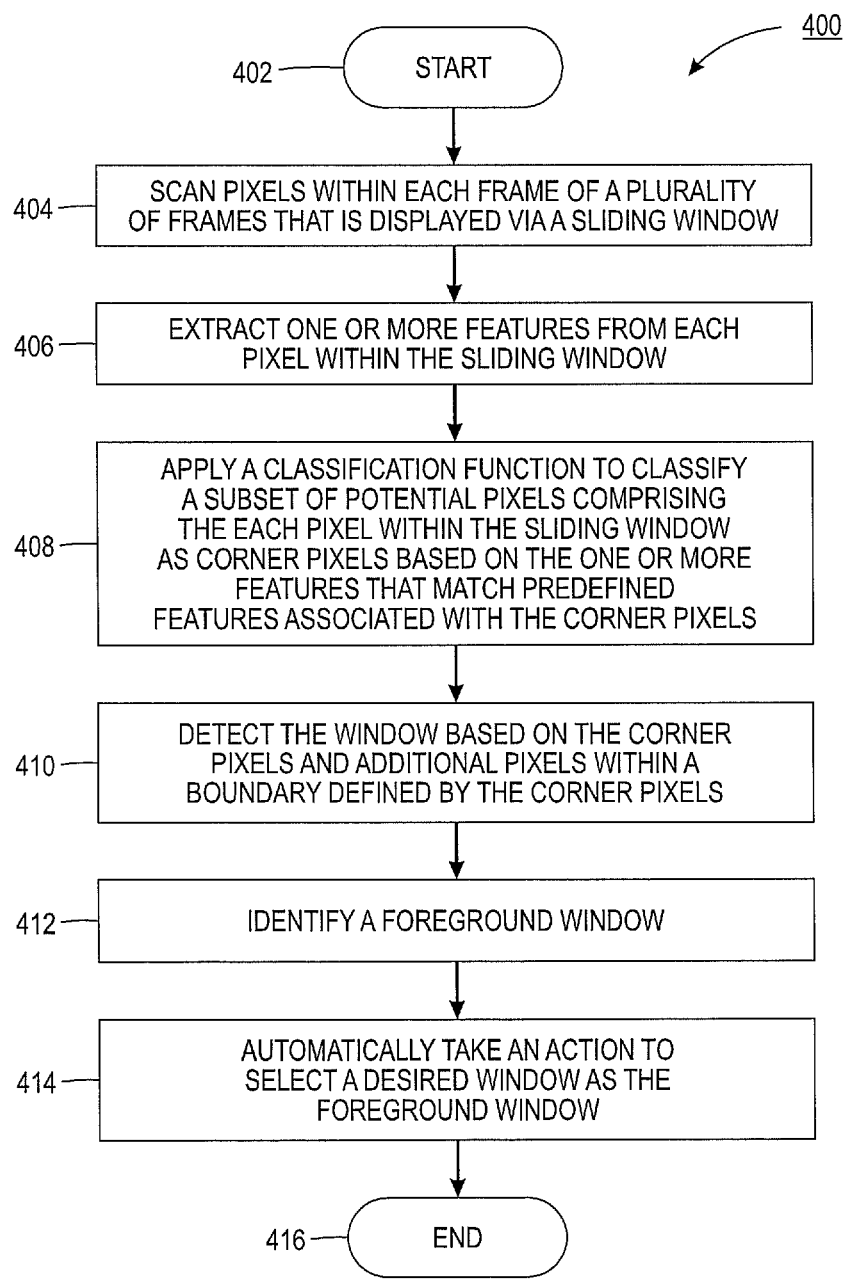
FIG. 4 illustrates a flowchart of an example method for detecting a window in a display.
Figure 5:
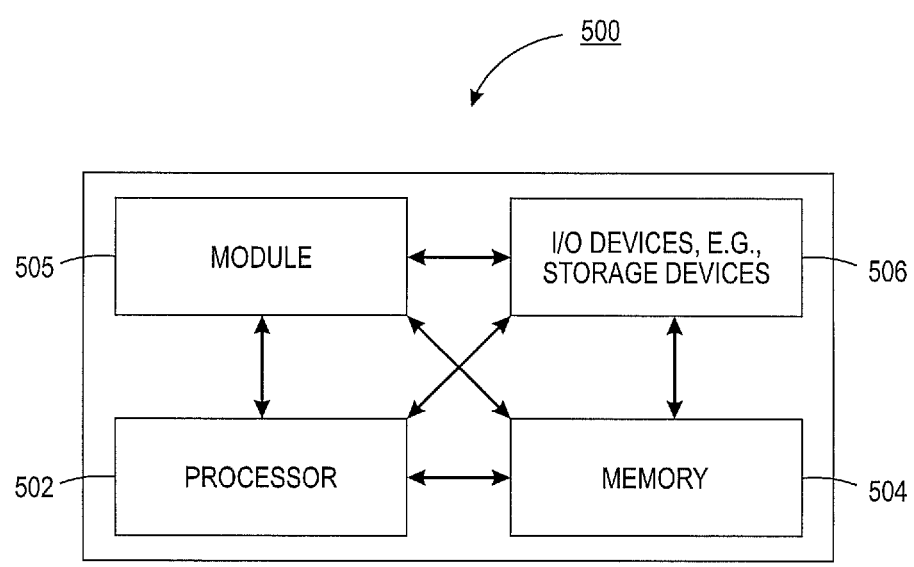
FIG. 5 illustrates a high-level block diagram of a computer suitable for use in performing the functions described herein.

FIG. 4 illustrates a flowchart of an example method 400 for detecting a window in a display. In one embodiment, one or more steps or operations of the method 400 may be performed by the apparatus 102 or a computer as illustrated in FIG. 5 and discussed below.

At block 402, the method 400 begins. At block 404, the method 400 scans pixels within each frame of a plurality of frames that is displayed via a sliding window. In one embodiment, the pixels may be a subset of pixels of all of the pixels in the frame. The subset of pixels may be defined by the size of the sliding window. For example, the sliding window may be a square 20×20 pixel window, a rectangular 20×5 pixel window, an "L" shape 5 pixel wide by 20 pixel long window, and the like.

In one embodiment, the sliding window may be moved from the top left corner of the frame to the bottom right corner of the frame pixel by pixel. For example, the sliding window may begin in the top left corner of the frame and move to the right one pixel at a time. The sliding window may then go down one pixel and move to the right one pixel at a time, and so forth. In other embodiments, the sliding window may be moved more than one pixel at a time.

At block 406, the method 400 extracts one or more features from each pixel within the sliding window. In one embodiment, a feature extraction function may be applied to the pixels within the sliding window to extract the one or more features. In one embodiment, Haar-like features may be extracted as described above.

At block 408, the method 400 applies a classification function to classify a subset of potential pixels comprising each pixel within the sliding window as corner pixels based on the one or more features that match predefined features associated with the corner pixels. For example, training images may be used to define the features that are likely to indicate that the pixel or pixels are a corner pixel (e.g., the predefined features). A classification function, such as the adaptive boosting classification function, may be applied to the features that are extracted from the pixels within the sliding window. The classification function may determine if any of the extracted features match the predefined features associated with the corner pixels.

At block 410, the method 400 detects the window based on the corner pixels and additional pixels within a boundary defined by the corner pixels. For example, at least three of the four corners of a window may define the boundaries of the window. As a result, when at least 3 corners of a window are detected, the region within the boundaries created by the three corners may identify the window. In one embodiment, a plurality of windows may be detected within the frame. In one embodiment, an additional feature extraction and classification function may be applied to the proposals to verify that the corners are in fact well positioned around a window, as described above.

At optional block 412, the method 400 identifies a foreground window. For example, when a plurality of windows are detected within the frame, the method 400 may detect which one of the plurality of windows is the foreground window. The foreground window may be defined to be the window that is on top of all the other windows that are detected. In another embodiment, if two windows appear to be on the same layer side-by-side, the foreground window may be determined to be the window that is currently active.

At optional block 414, the method 400 automatically takes an action to select a desired window as the foreground window. For example, if the detected foreground window is not the desired window, then the method 400 may take an action to change the foreground window. For example, the action may be to close the foreground window that is detected in block 412 to allow another window to become the foreground window. The blocks 412 and 414 may be repeated until the desired window is selected to be the foreground window. In another embodiment, the desired window may be selected causing the selected window to become the foreground window instead of the foreground window detected in block 412.

As a result, pop-up windows may be automatically deselected or closed to allow an automated bot application to continuously retrieve information from a website without interruption. At block 416, the method 400 ends.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application.

FIG. 5 depicts a high-level block diagram of a computer that can be transformed into a machine that is dedicated to perform the functions described herein. As a result, the embodiments of the present disclosure improve the operation and functioning of computer or processing device to detect a window in a display, as disclosed herein.

As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for detecting a window in a display, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for detecting a window in a display (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for detecting a window in a display (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for detecting a window in a display, comprising:
    determining, by a processor, a color scheme of windows for an operating system using the window;
    creating, by the processor, predefined features associated with a set of corner pixels for the color scheme that is deployed on the operating system, wherein the pre-defined features are represented as a triplet of a Haar-like feature comprising a type of feature, a color channel and a region defined by a left coordinate, a top coordinate, a right coordinate and a bottom coordinate;
    scanning, by the processor, all pixels of each frame of a plurality of frames that is displayed via a sliding window that comprises a subset of pixels of the all pixels of the frame;
    extracting, by the processor, the Haar-like feature of each pixel within the sliding window;
    applying, by the processor, an Adaptive Boosting classification to select and combine a plurality of triplets associated with the Haar-like feature of a subset of potential pixels comprising the each pixel within the sliding window that have features that match the pre-defined features to generate a decision function that identifies corner pixels; and
    detecting, by the processor, the window based on the corner pixels and additional pixels within a boundary defined by the corner pixels.

2. The method of claim 1, further comprising:
    detecting, by the processor, a plurality of windows based on the corner pixels; and
    identifying, by the processor, a foreground window based on a relative position of each one of the plurality of windows.

3. The method of claim 2, further comprising:
    determining, by the processor, that the foreground window is not a desired foreground window; and
    closing, by the processor, the foreground window.

4. The method of claim 2, further comprising:
    determining, by the processor, that the foreground window is not a desired foreground window; and
    selecting, by the processor, a different window of the plurality of windows to be the foreground window.

5. The method of claim 1, wherein the predefined features identified by the Haar-like feature comprise an edge.

6. The method of claim 5, wherein the edge is defined by pixels having an average variance in a type of feature below a threshold.

7. A non-transitory computer-readable medium storing a plurality of instructions, which when executed by a processor, cause the processor to perform operations for detecting a window in a display, the operations comprising:
    determining a color scheme of windows for an operating system using the window;
    creating predefined features associated with a set of corner pixels for the color scheme that is deployed on the operating system, wherein the predefined features are represented as a triplet of a Haar-like feature comprising a type of feature, a color channel and a region defined by a left coordinate, a top coordinate, a right coordinate and a bottom coordinate;
    scanning all pixels of each frame of a plurality of frames that is displayed via a sliding window that comprises a subset of pixels of the all pixels of the frame;
    extracting the Haar-like feature of each pixel within the sliding window;
    applying an Adaptive Boosting classification to select and combine a plurality of triplets associated with the Haar-like feature of a subset of potential pixels comprising the each pixel within the sliding window that have features that match the pre-defined features to generate a decision function that identifies corner pixels; and
    detecting the window based on the corner pixels and additional pixels within a boundary defined by the corner pixels.

8. The non-transitory computer-readable medium of claim 7, the operations further comprising:
    detecting a plurality of windows based on the corner pixels; and
    identifying a foreground window based on a relative position of each one of the plurality of windows.

9. The non-transitory computer-readable medium of claim 8, the operations further comprising:
    determining that the foreground window is not a desired foreground window; and
    closing the foreground window.

10. The non-transitory computer-readable medium of claim 8, the operations further comprising:
    determining that the foreground window is not a desired foreground window; and
    selecting a different window of the plurality of windows to be the foreground window.

11. The non-transitory computer-readable medium of claim 7, wherein the pre-defined features identified by the Haar-like feature comprise an edge.

12. The non-transitory computer-readable medium of claim 11, wherein the edge is defined by pixels having an average variance in a type of feature below a threshold.

* * * * *